United States Patent

Altmann et al.

Patent Number: 5,669,350
Date of Patent: Sep. 23, 1997

[54] THROTTLE DEVICE

[75] Inventors: Otto Altmann, Rosenheim; Gerhard Brenner, Asperg, both of Germany

[73] Assignee: Filterwerk Mann & Hummel GmbH, Ludwigsburg, Germany

[21] Appl. No.: 602,767

[22] PCT Filed: Aug. 29, 1994

[86] PCT No.: PCT/EP94/02853

§ 371 Date: Mar. 4, 1996

§ 102(e) Date: Mar. 4, 1996

[87] PCT Pub. No.: WO95/06808

PCT Pub. Date: Mar. 9, 1995

[30] Foreign Application Priority Data

Sep. 2, 1993 [DE] Germany .................. 43 29 527.4

[51] Int. Cl.⁶ .................. F02D 9/10; F16K 1/22
[52] U.S. Cl. .................. 123/337; 251/306; 264/255; 425/588
[58] Field of Search .................. 123/336, 337, 123/184.61; 251/305, 306, 357, 358; 261/65; 264/241, 250, 254, 255; 425/542, 588

[56] References Cited

U.S. PATENT DOCUMENTS

| | | |
|---|---|---|
| 3,696,798 | 10/1972 | Bishop et al. .................. 123/262 |
| 3,710,769 | 1/1973 | Knapp et al. .................. 123/457 |
| 3,777,725 | 12/1973 | Stumpp et al. .................. 123/452 |
| 4,176,823 | 12/1979 | Gliatas .................. 123/306 |
| 4,344,396 | 8/1982 | Yamada .................. 123/337 |
| 4,411,405 | 10/1983 | Barbe .................. 251/306 |
| 4,776,313 | 10/1988 | Freismuth et al. .................. 123/184.61 X |
| 5,035,214 | 7/1991 | Daly et al. .................. 123/337 |
| 5,181,492 | 1/1993 | Sausner et al. .................. 123/337 |

FOREIGN PATENT DOCUMENTS

| | | | |
|---|---|---|---|
| 4010229 | 10/1991 | Germany | .................. 123/337 |
| 5-171960 | 7/1993 | Japan | .................. 123/337 |
| 1061651 | 3/1967 | United Kingdom . | |
| 1405367 | 9/1975 | United Kingdom . | |

*Primary Examiner*—Tony M. Argenbright
*Attorney, Agent, or Firm*—Evenson, McKeown, Edwards & Lenahan P.L.L.C.

[57] ABSTRACT

Throttle butterfly, especially a throttle butterfly in an intake channel of an internal-combustion engine which has a throttle butterfly shaft extending concentrically to a central axis. The throttle butterfly as well as the housing surrounding it have sealing surfaces facing one another.

13 Claims, 4 Drawing Sheets

THROTTLE DEVICE

The invention relates to a throttle device, and more particularly to a throttle butterfly in an intake channel of an internal-combustion engine.

A throttle butterfly is known, for example, from European Patent Document EP 0 498 933 A1. This throttle butterfly is integrated into a housing which may be fastened to a carrying body. The housing is constructed in the manner of a throttle butterfly stub pipe; that is, the stub pipe is, on the one side, fastened to the carrying body and, on the other side, to the intake system of an internal-combustion engine.

A disadvantage of this throttle butterfly fastening is the fact that a larger number of structural elements is required as well as a larger number of sealing elements between the individual components.

Furthermore, from International Patent Document WO 91 05 152, a throttle device is known for reducing the charge cycle losses in the case of an internal-combustion engine. This throttle device is also a separate component which, on the one side, must be connected to the intake system of an engine and, on the other side, must be connected to an air-carrying system.

In the course of the required reduction of components for the purpose of saving cost, of optimization and of reducing weight in vehicle and automobile manufacturing, the endeavor to produce complete systems which implement this goal is recognized.

It is therefore an object of the invention to provide a throttle device which can be produced in a cost-saving manner and can also be integrated into modern intake systems.

It is an important advantage of the invention that the consequent use of synthetic material in the area of the intake system of an internal-combustion engine is largely taken into account.

Structures made of synthetic materials require special constructions. Problems, such as vibrations and warping, anisotropy, conditioning states and others, must be taken into account constructively.

In addition, synthetic material has other interesting features, such as resistance to corrosion, high mechanical damping, an extremely low coefficient of friction, low wear, a low specific weight, good machinability and low finished-part costs in the case of mass productions. Particularly, the latter suitability of the synthetic materials for a finishing at reasonable cost, which is particularly striking during the injection molding of parts having a complicated design, makes synthetic materials superior to other materials.

Known throttle butterfly or throttle devices were normally made of metal, preferably of aluminum and were arranged between a synthetic air filter and a synthetic intake pile. By means of the integration of the throttle butterfly into one of these two systems and by means of the consequent application of synthetic material, a considerable weight and cost reduction is achieved.

According to an advantageous embodiment of the invention, it is provided to apply an elastomer to the sealing surface on the throttle butterfly side. This elastomer may be may be integrated in the throttle butterfly. A known manufacturing process for this purpose is the two-component injection molding process in which the throttle butterfly made of the synthetic material is produced first and, in a second operation, within the same mold, the elastomer seal is injected into an opening channel. However, it is also possible to mount the molded elastomer parts subsequently. This type of sealing takes into account the synthetic-material-specific circumstances and considerably reduces the leakage air rates.

Another advantageous embodiment of the invention is the bipartition of the throttle butterfly shaft. Two-part throttle butterfly shafts can be mounted particularly easily and have the advantage that each shaft portion can be equipped with specific components, such as sensors or control elements and, during a mounting, only these two preassembled elements must be adapted to the housing.

The advantage of this idea is mainly the increased flexibility of different regulating and control elements and the service-friendly construction. Individual elements may be repaired or exchanged at reasonable cost.

Another embodiment of the throttle device provides to use of a so-called relaxation process for the optimal sealing between the throttle butterfly stub pipe and the throttle butterfly. This means that the throttle butterfly experiences a reduction of elasticity, this advantageously taking place by tempering. The tempering is carried out in the zero position, that is, in the position in which the throttle butterfly rests against the throttle butterfly stub pipe or the sealing shoulder of the throttle butterfly stub pipe.

This relaxation process causes a creeping or flowing of the synthetic material of the throttle butterfly and therefore an adaptation of this throttle butterfly to the throttle butterfly stub pipe. This process is interrupted as soon as the throttle butterfly has reached its optimal form; that is, as soon as the sealing action corresponds to the preset value.

In an embodiment of the invention, the throttle butterfly is produced by means of the 2-K plastic injection molding technique. In the case of this injection molding technique, the core of the part to be injection-molded is first cast in a mold. Subsequently, by means of the returning of slides, capacities are created which are cast in a second operation in the same mold.

These and other characteristics of preferred embodiments of the invention, in addition to being described in the claims, are also indicated in the specification and the drawings, in which case the individual characteristics may each be implemented alone or as several characteristics in the form of subcombinations in the case of the embodiment of the invention and may be implemented in other fields and may represent advantageous embodiments as well as embodiments that can be protected separately for which a protection is claimed here.

In the following, the invention will be explained in detail by means of embodiments.

Figure 4A:
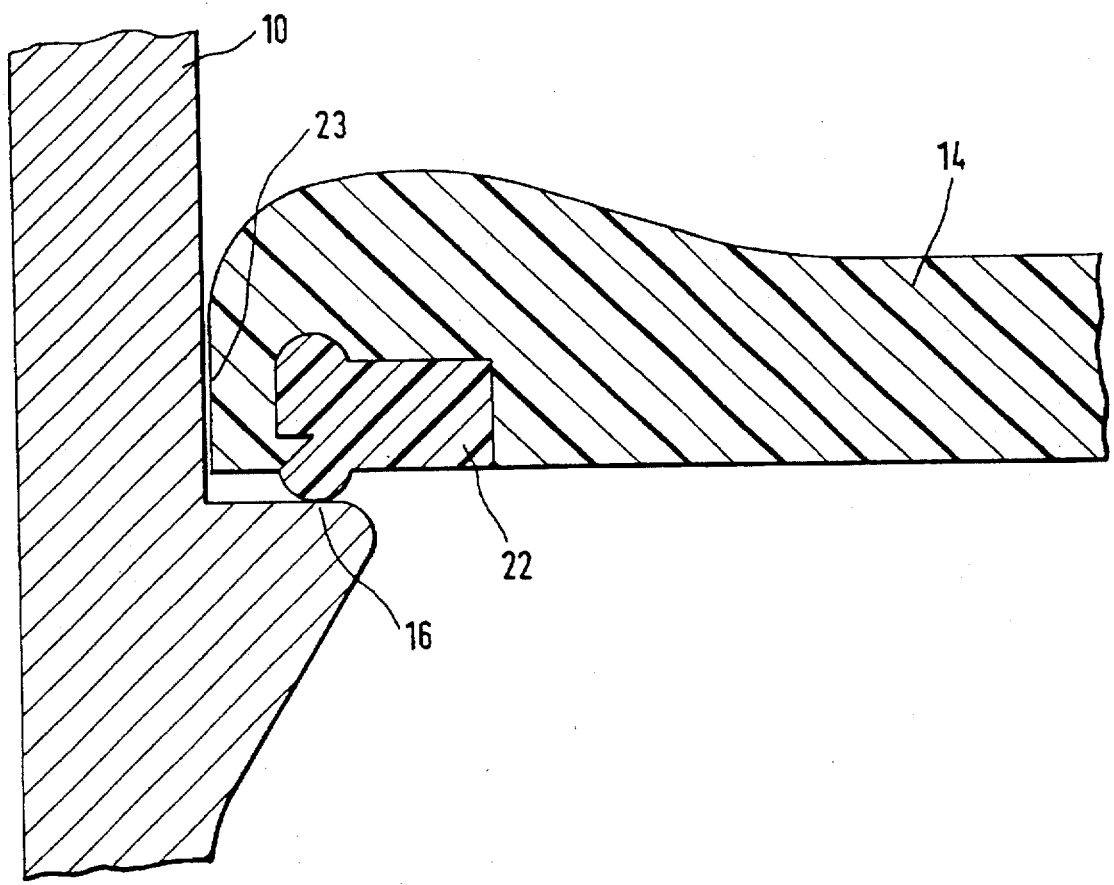
Figure 5:
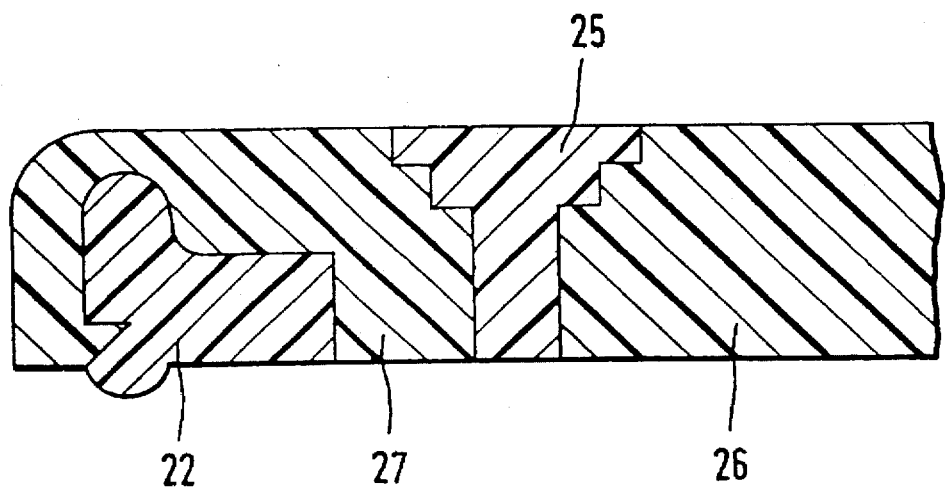
Figure 6:
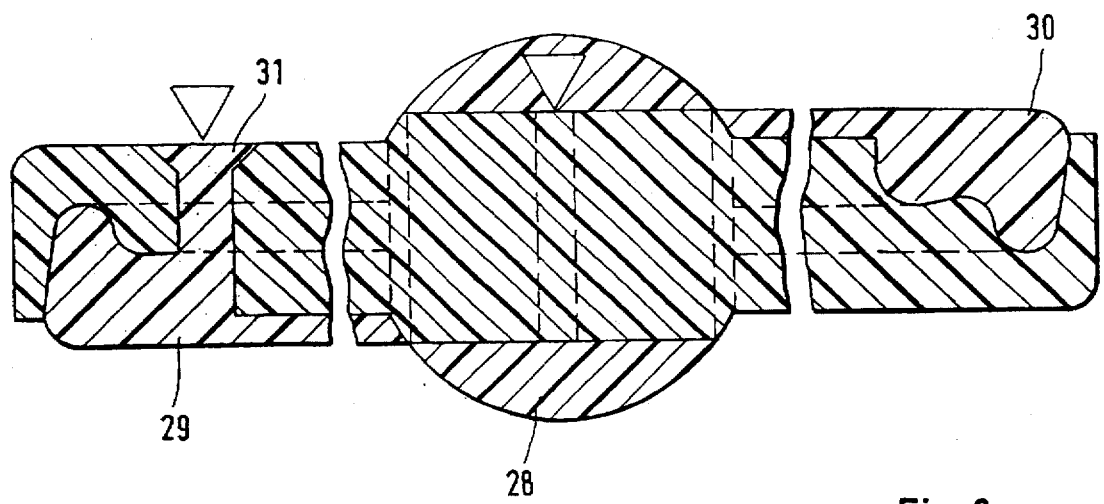

FIGS. 4a, b are representations of a detail of a throttle butterfly during a relaxation process;

FIG. 5 is a representation of a detail of a throttle butterfly with a tolerance compensation;

FIG. 6 is a sectional view of a throttle butterfly with elastomer sealing surfaces.

Figure 1:
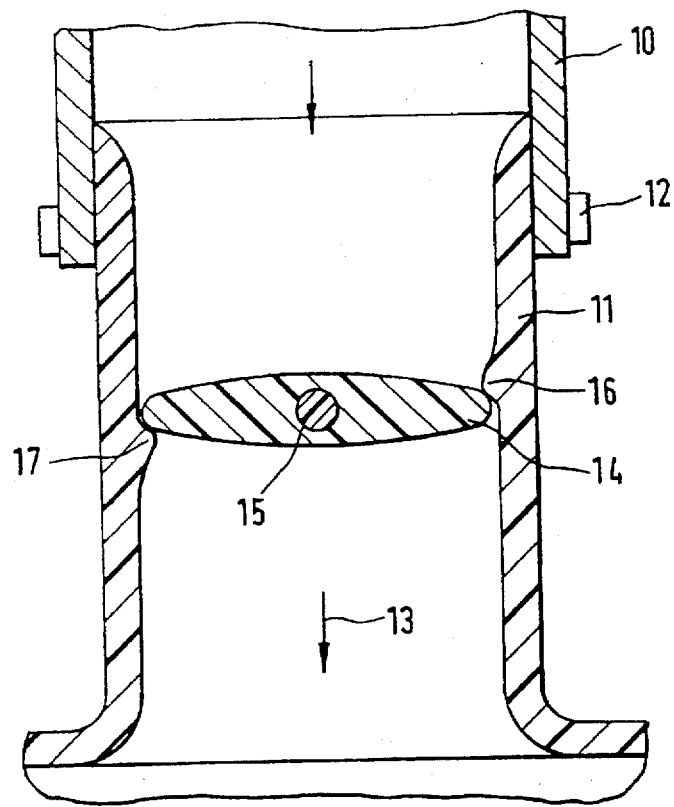
FIG. 1 is a view of a throttle butterfly which is integrated into an intake system.

FIG. 1 illustrates the fresh air pipe 10 of an air filter for an internal-combustion engine. This fresh air pipe, for example, by way of a flange connection, receives the connection stub pipe of a plastic inlet manifold 11. The flange connection consists, for example, of a clamping ring 12 and is only outlined here. The fresh air to be supplied to the engine flows according to the arrow 13, while the throttle butterfly is open, into the plastic inlet manifold. The throttle butterfly 14 is disposed on a throttle butterfly shaft 15 and, in the closed condition, rests on bead-type sealing surfaces 16, 17. While the throttle butterfly 14 is made of a synthetic material, the throttle butterfly shaft 15, which may, for example, also be divided into two parts and is constructed as a stub shaft, may be constructed of metal or also of a synthetic material.

The plastic intake system 11 is, for example, produced by means of the molten-core technique or half-shell injection molding technique, in which case the molten core ends in the sealing surface area 16, 17 and the upper part of the plastic inlet manifold is produced by way of a core puller.

Figure 2:
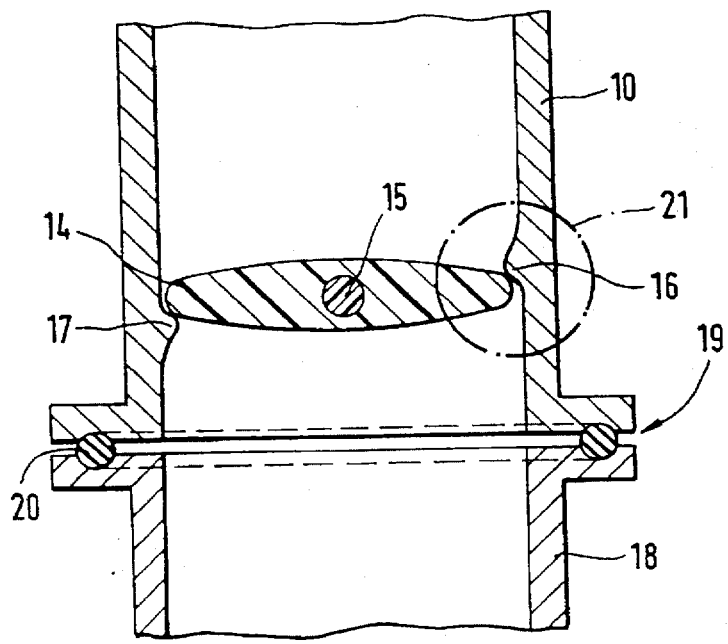
FIG. 2 is a view of a throttle butterfly which is integrated into an air filter fresh air duct.

In FIG. 2, the throttle butterfly 14 is integrated into the fresh air pipe 10. The throttle butterfly is designed in an aerodynamically optimal pocket watch shape; other geometries are also possible, such as jib propeller or neutral web butterflies. For this purpose, the fresh air pipe is provided with sealing surfaces 16, 17. By way of a flange connection 19 having a sealing ring 20, the intake system 18 is connected with the fresh air pipe 10. The sealing surfaces 16, 17 on the fresh air pipe can be produced with a high precision by means of suitable core pullers. In this construction, the throttle butterfly shaft 15 is also a divided stub shaft which permits a simple mounting of the throttle butterfly into the fresh air pipe 10 which may, for example, also be an elastomer part.

Figure 3:
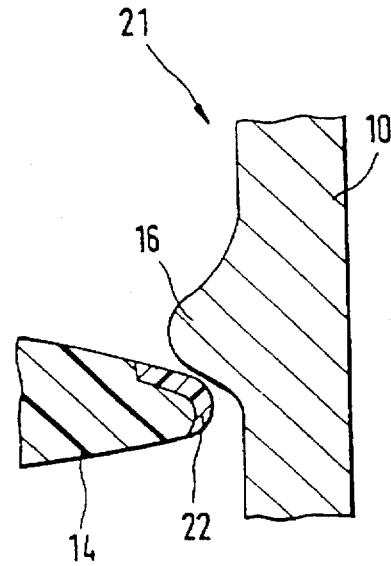
FIG. 3 is a view of a detail of a throttle butterfly with an integrated sealing element.

FIG. 3 illustrates an enlarged detail 21 of FIG. 2. The sealing surface 16 of the fresh air pipe 10 is in contact with an elastomer seal 22 integrated into the throttle butterfly 14. This elastomer seal may be produced by the 2K injection molding technique and is therefore particularly reasonable in price. As a result of the use of an elastomer sealing, extremely low leakage air rates are achieved and a jamming of the butterfly is prevented. Naturally the seal may also be a conventional assembled rubber seal.

FIG. 4a illustrates a detail of a throttle butterfly 14. This throttle butterfly is arranged in a fresh air pipe 10. On the fresh air pipe 10, a sealing surface 16 is provided on which the throttle butterfly rests. For a reliable sealing, an elastomer seal 22 is integrated in the throttle butterfly 14. The outer contour of the throttle butterfly in the area of the surface 23 has a slightly smaller diameter than the inside diameter of the fresh air pipe 10.

Figure 4B:
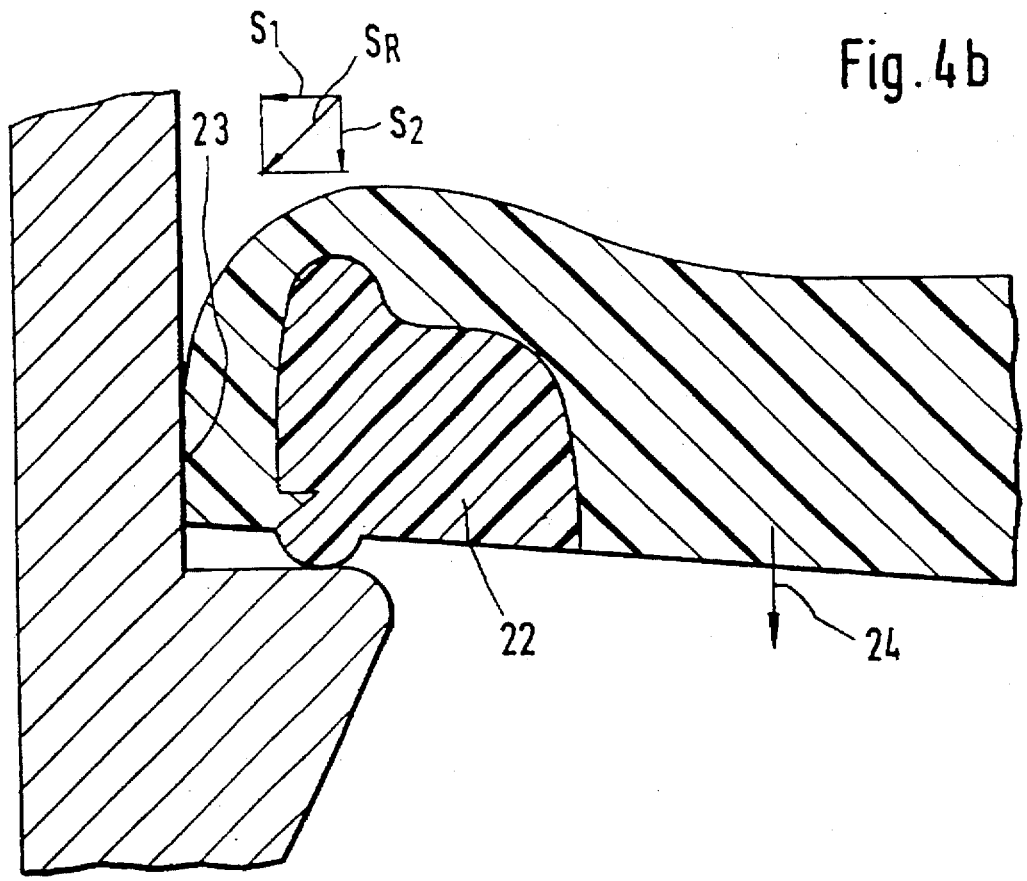

For adapting the exterior surface 23 to the contour of the fresh air stub pipe, the throttle butterfly is subjected to a tempering process. For this purpose, a force F is generated according to the arrow 24 in FIG. 4b. This force F is essentially formed by the swivelling of the throttle butterfly 15 about the swivel point of the throttle butterfly shaft 15 according to FIG. 2. Because of this force and because of the tempering process, a resulting movement will occur along the arrow SR until the surface 23 of the throttle butterfly on the lower edge is adapted to the inner contour of the throttle butterfly stub pipe.

Naturally, this relaxation operation may also be achieved by means of other devices, for example, by means of ultrasound or other elasticity reducing measures. It is decisive in this case that an adaptation of the throttle butterfly to the existing contour takes place.

FIG. 5 illustrates another detail of a throttle butterfly, On the one hand, an elastomeric element 22 is arranged in this throttle butterfly as a sealing element. Furthermore, this throttle butterfly has an additional element 25. This element 25 has the task of causing an uncoupling of the throttle butterfly area 26 with respect to the throttle butterfly area 27. In this case, the element 25 may be an elastomer or a synthetic material with special flow characteristics. During the relaxation process, this uncoupling element contributes to a better adaptation of the throttle butterfly contour to the contour of the fresh air stub pipe or of the throttle butterfly stub pipe which is not shown in the drawing. The element 25 also may be produced in the 2-K plastic injection molding process in one operation together with the throttle butterfly.

According to FIG. 6, the throttle butterfly is constructed by means of the 2-K technique; that is, the body 28 is produced in the first operation; in the second operation, the sealing profiles 29, 30 are injection-molded to the body 28 in the same mold. So that the placing of the elastomer or of the elastic synthetic material can take place in a simple manner from the direction of a face of the throttle butterfly, as illustrated, an injection opening 31 is arranged on the left side. Through this injection opening 31, the plasticized mass for the sealing element 29 is introduced. On the right side, the plasticized material can be injected from above. This process has the advantage that high-expenditure injection ducts are not required.

We claim:

1. A throttle device comprising a throttle butterfly shaft extending concentrically to a central axis, and a throttle butterfly disposed on said shaft, said throttle butterfly being formed by the 2-K two component injection molding technique with butterfly flaps formed of a synthetic resin material and with butterfly sealing surfaces formed of another material integrated into said butterfly flaps, said throttle butterfly being received in a surrounding housing with said butterfly sealing surfaces facing mating sealing surfaces on said housing, said throttle butterfly being directly integrated into at least one of a filtered air outlet duct of an air filter and an inlet duct of an intake manifold.

2. A throttle device according to claim 1, wherein said throttle butterfly is arranged in an intake manifold of an internal-combustion engine.

3. A throttle device according to claim 1, wherein said throttle butterfly is directly integrated into an inlet duct of an intake manifold, and said intake manifold is formed of synthetic resin material.

4. A throttle device according to claim 1, wherein the butterfly sealing surfaces are formed of an elastomeric material.

5. A throttle device according to claim 1, wherein the throttle butterfly shaft is a stub shaft divided into two parts.

6. A throttle device according to claim 1, wherein said mating sealing surfaces are manifold sealing surfaces formed interiorly of an intake manifold of an internal combustion engine, and the sealing surfaces of said throttle butterfly are sealingly fitted to said manifold sealing surfaces by a relaxation.

7. A throttle device according to claim 6, wherein said relaxation is effected by means of a tempering procedure.

8. A throttle device according to claim 7, wherein said tempering procedure is carried out with the throttle butterfly installed in the intake manifold in zero throttle position.

9. A throttle device according to claim 4, wherein the butterfly sealing surfaces formed of elastomeric material are provided with at least one injection opening situated on a face of the throttle butterfly.

10. A method of manufacturing a throttle butterfly having butterfly flaps and having butterfly sealing surfaces integrated into said butterfly flaps, said method comprising the steps of:

(a) providing a mold which has a first mold space in the form of said butterfly flaps and which has additional mold spaces in the form of said butterfly sealing surfaces, said additional mold spaces being selectively closable and openable;

(b) injecting a synthetic resin material into said first mold space while said additional mold spaces are closed in order to form said butterfly flaps;

(c) opening said additional mold spaces; and (d) injecting an elastomeric material into said additional mold spaces to form said butterfly sealing surfaces.

11. A method of manufacturing a throttle butterfly according to claim 10, wherein said throttle butterfly has first and second butterfly flaps extending in opposite directions from a central axis, said first and second butterfly flaps together defining first and second oppositely disposed faces of said throttle butterfly, said first butterfly flap including one of said butterfly sealing surfaces on said first face, and said second butterfly flap including one of said butterfly sealing surfaces on said second face, wherein in step (d) said elastomeric material is injected into said additional mold spaces from an identical one of said faces to form said butterfly sealing surfaces of said first and second butterfly flaps.

12. A mold for manufacturing a throttle butterfly by the 2-K two component injection molding technique, said throttle butterfly having butterfly flaps and having butterfly sealing surfaces integrated into said butterfly flaps, said mold comprising:

a first mold space in the form of said butterfly flaps; and additional mold spaces in the form of said butterfly sealing surfaces, said additional mold spaces being selectively closable and openable.

13. A mold for manufacturing a throttle butterfly according to claim 12, wherein said first mold space defines first and second butterfly flaps extending in opposite directions from a central axis, said first and second butterfly flaps together defining first and second oppositely disposed faces of said throttle butterfly, a first of said additional mold spaces defining one of said butterfly sealing surfaces on said first face of said first butterfly flap, and a second of said additional mold spaces defining one of said butterfly sealing surfaces on said second face of said second butterfly flap, wherein said first additional mold space communicates with said second face of said first butterfly flap.

* * * * *